US011245853B2

(12) United States Patent
Kim et al.

(10) Patent No.: US 11,245,853 B2
(45) Date of Patent: Feb. 8, 2022

(54) MULTI-CAMERA APPARATUS AND IMAGE CAPTURING SYSTEM INCLUDING THE SAME

(71) Applicant: HANWHA TECHWIN CO., LTD., Seongnam-si (KR)

(72) Inventors: Dae Kyung Kim, Seongnam-si (KR); Kil Hwa Hong, Seongnam-si (KR); Ho Seoung Hwang, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/842,196

(22) Filed: Apr. 7, 2020

(65) Prior Publication Data

US 2021/0058556 A1 Feb. 25, 2021

(30) Foreign Application Priority Data

Aug. 21, 2019 (KR) .................. 10-2019-0102446

(51) Int. Cl.
| | |
|---|---|
| *H04N 5/232* | (2006.01) |
| *H04N 5/225* | (2006.01) |
| *H04N 5/247* | (2006.01) |
| *H04N 7/18* | (2006.01) |

(52) U.S. Cl.
CPC ....... *H04N 5/23299* (2018.08); *H04N 5/2253* (2013.01); *H04N 5/247* (2013.01); *H04N 7/18* (2013.01)

(58) Field of Classification Search
CPC .. H04N 5/23299; H04N 5/2253; H04N 5/247; H04N 7/18; H04N 7/181; H04N 5/23241; H04N 5/2258; H04N 5/2251; H04N 5/2257; H04N 5/23296; H04N 5/2328; G03B 17/561
See application file for complete search history.

(56) References Cited

U.S. PATENT DOCUMENTS

| | | | | |
|---|---|---|---|---|
| 2,915,584 | A | * 12/1959 | Daugherty | ............. H04N 5/846 386/201 |
| 2014/0153916 | A1 | * 6/2014 | Kintner | .............. H04N 5/23238 396/419 |
| 2016/0191813 | A1 | * 6/2016 | Wu | ....................... H04N 5/2252 348/159 |
| 2017/0146184 | A1 | 5/2017 | Centurioni et al. | |
| 2017/0295309 | A1 | * 10/2017 | Cabral | ................ H04N 5/2352 |
| 2017/0299949 | A1 | 10/2017 | Donaldson | |

(Continued)

FOREIGN PATENT DOCUMENTS

| | | | |
|---|---|---|---|
| DE | 3727961 | A1 * 3/1988 | ............. G02B 26/02 |
| JP | 6418433 | B1 11/2018 | |

(Continued)

*Primary Examiner* — Robert J Hance
(74) *Attorney, Agent, or Firm* — Sughrue Mion, PLLC

(57) ABSTRACT

A multi-camera apparatus includes: a driving base in which a movement path is formed; at least one camera mount, each of which includes a respective camera module mounted therein, and is configured to contact the driving base and move along the movement path; and a shaft provided at a center of the driving base and coupled to the driving base, wherein each of the at least one camera mount is connected to the shaft and configured to move along a circumference of the driving base with the shaft as a rotational center.

16 Claims, 7 Drawing Sheets

(56) References Cited

U.S. PATENT DOCUMENTS

| | | | | |
|---|---|---|---|---|
| 2018/0316843 A1* | 11/2018 | Guyot | ............... | F16M 11/14 |
| 2019/0287359 A1* | 9/2019 | Kondou | ........... | G08B 13/19617 |
| 2020/0154055 A1* | 5/2020 | Schieltz | ............. | H04N 5/23203 |
| 2021/0072625 A1* | 3/2021 | Ye | ........................ | G03B 17/561 |
| 2021/0092265 A1* | 3/2021 | Li | ........................ | G03B 37/04 |

FOREIGN PATENT DOCUMENTS

| | | | | |
|---|---|---|---|---|
| KR | 100997877 B1 * | 12/2010 | ............. | F16M 11/18 |
| KR | 10-1198485 B1 | 11/2012 | | |

\* cited by examiner

MULTI-CAMERA APPARATUS AND IMAGE CAPTURING SYSTEM INCLUDING THE SAME

CROSS-REFERENCE TO THE RELATED APPLICATION

This application claims the priority from and is based on Korean Patent Application No. 10-2019-0102446, filed on Aug. 21, 2019, in the Korean Intellectual Property Office, the disclosure of which is incorporated herein in its entirety by reference.

BACKGROUND

1. Field

One or more embodiments relate to a multi-camera apparatus and an image capturing system including the same, and more particularly, to a multi-camera apparatus capable of obtaining a vivid image by preventing shaking of a camera mount during motion and an image capturing system including the multi-camera apparatus.

2. Description of Related Art

In general, a closed circuit television (CCTV) refers to a system configured to obtain an image of a certain place by using a module-type camera and transmit the obtained image to a certain receiver.

In detail, a CCTV includes a module-type camera mounted in a certain place and a computer device remotely exchanging through a monitor information about an image with the module-type camera via wired or wireless networks. The module-type camera may be mounted in a road or an alley as well as an office, a house, a hospital, and a public building that requires security and be mainly used for crime prevention.

When a camera according to the related art performs a panning operation in which the camera rotates around a rotational axis, a rotation path is formed along a guide rail having wheels arranged at both sides thereof. Thus, the camera may move on the guide rail by using power of a driving motor mounted in the rotational axis. However, since the driving motor is located in the rotational axis and a radius of rotation is increased, more torque is required and a moving speed of the camera is significantly reduced.

Also, when the camera moves on the guide rail, shaking may continually occur, which deteriorates a capturing quality of the camera.

SUMMARY

One or more embodiments include a multi-camera apparatus including a plurality of camera modules moving on a movement path while maintaining a constant height, decreasing a radius of rotation to reduce required power, and increasing a moving speed to enable rapid movement and capturing.

One or more embodiments include a multi-camera apparatus capable of preventing shaking when a camera module is in motion, so that a quality of an image captured by the camera module is improved.

However, these objectives are examples and the disclosure is not limited thereto.

Additional aspects will be set forth in part in the description which follows and, in part, will be apparent from the description, or may be learned by practice of the presented embodiments of the disclosure.

According to one or more embodiments, a multi-camera apparatus includes: a driving base in which a movement path is formed; at least one camera mount, each of which may include a respective camera module mounted therein, and may be configured to contact the driving base and move along the movement path; and a shaft provided at a center of the driving base and coupled to the driving base, wherein each of the at least one camera mount may be connected to the shaft and configured to move along a circumference of the driving base with the shaft as a rotational center.

The at least one camera mount may be a plurality of camera mounts, the plurality of camera mounts may include a plurality of camera mounting bodies such that each camera mount includes a respective camera mounting body, from among the plurality of camera mounting bodies, in which the respective camera module is mounted, and the plurality of camera mounts further include connectors such that each camera mount includes a connector, from among the connectors, coupled to the respective camera mounting body of the camera mount and connected to the shaft.

The connectors of the plurality of camera mounts may be each formed in a ring shape, may each connected to the shaft, and may surround the shaft.

The connectors of the plurality of camera mounts may be stacked along a longitudinal central axis of the shaft.

The shaft may include a shaft body arranged inside each of the connectors of the plurality of camera mounts; and a shaft cover having a larger area than a cross-sectional area of the shaft body and coupled to an end of the shaft body.

The multi-camera apparatus may further include a regulator which is arranged outside the shaft body to face the shaft cover, is configured to contact at least one from among the connectors of the plurality of camera mounts, and regulates locations of the connectors of the plurality of camera mounts.

The regulator may have an elastic restoring force from the driving base toward the shaft cover and may push the connectors of the plurality of camera mounts toward the shaft cover.

The regulator may include a regulating plate arranged below the connectors such that the connectors are located between the shaft cover and the regulating plate, and an elastic member including an elastic material and configured to push the regulating plate toward the shaft cover.

The elastic member may include a coil spring.

An inserter formed in the regulating plate to may project toward the elastic member, and the inserter may be inserted into the elastic member.

The plurality of camera mounts may further include power transmitters such that a power transmitter, from among the power transmitters, is provided with a respective camera mount from among the camera mounting bodies, each power transmitter from among the power transmitter may be configured to receive power from outside and transmit the power to a respective one of the plurality of camera mounting bodies so as to cause the respective one of the plurality of camera mounting bodies to move on the driving base, and each of the power transmitters may include a motor.

The power transmitters may interlock with the driving base and transmit the power to each of the plurality of camera mounting bodies, respectively, so that each of the plurality of camera mounting bodies move along the circumference of the driving base.

A gear may be formed along an inner circumferential surface of the driving base and the power transmitters may interlock with the gear.

The multi-camera apparatus may further include a cover covering the driving base and the at least one camera mount, where the cover may be coupled to the shaft.

The cover may be formed in a dome shape.

A bent portion may be formed in the cover is connected to the shaft, and the bent portion may have a predetermined radius of curvature.

According to one or more embodiments, an image capturing system may include: a plate; and a multi-camera apparatus mounted to the plate, wherein the plate may be fixed outside the multi-camera apparatus, and the multi-camera apparatus may include: a driving base in which a movement path is formed; at least one camera mount, each of which may include a respective camera module mounted therein, and may be configured to contact the driving base and move along the movement path; and a shaft provided at a center of the driving base and coupled to the driving base, wherein each of the at least one camera mount may be connected to the shaft and configured to move along a circumference of the driving base with the shaft as a rotational center.

According to one or more embodiments, a multi-camera apparatus may include: a driving base in which a movement path is formed; a camera mount including a camera module mounted therein, and the camera mount may be configured to contact the driving base and move along the movement path; and a shaft provided at a center of the driving base and coupled to the driving base, wherein the camera mount may be connected to the shaft and configured to move along a circumference of the driving base with the shaft as a rotational center, and the camera mount may include a camera mounting body that includes the camera module mounted therein, and the camera mount may further include a connector coupled to the camera mounting body and connected to the shaft.

The connector of the camera mount may be formed in a ring shape, may be connected to the shaft, and may surround the shaft.

The camera mount may further include a power transmitter configured to receive power from outside and transmit the power to the camera mounting body so as to cause the camera mounting body to move on the driving base, and the camera mount may include a motor.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
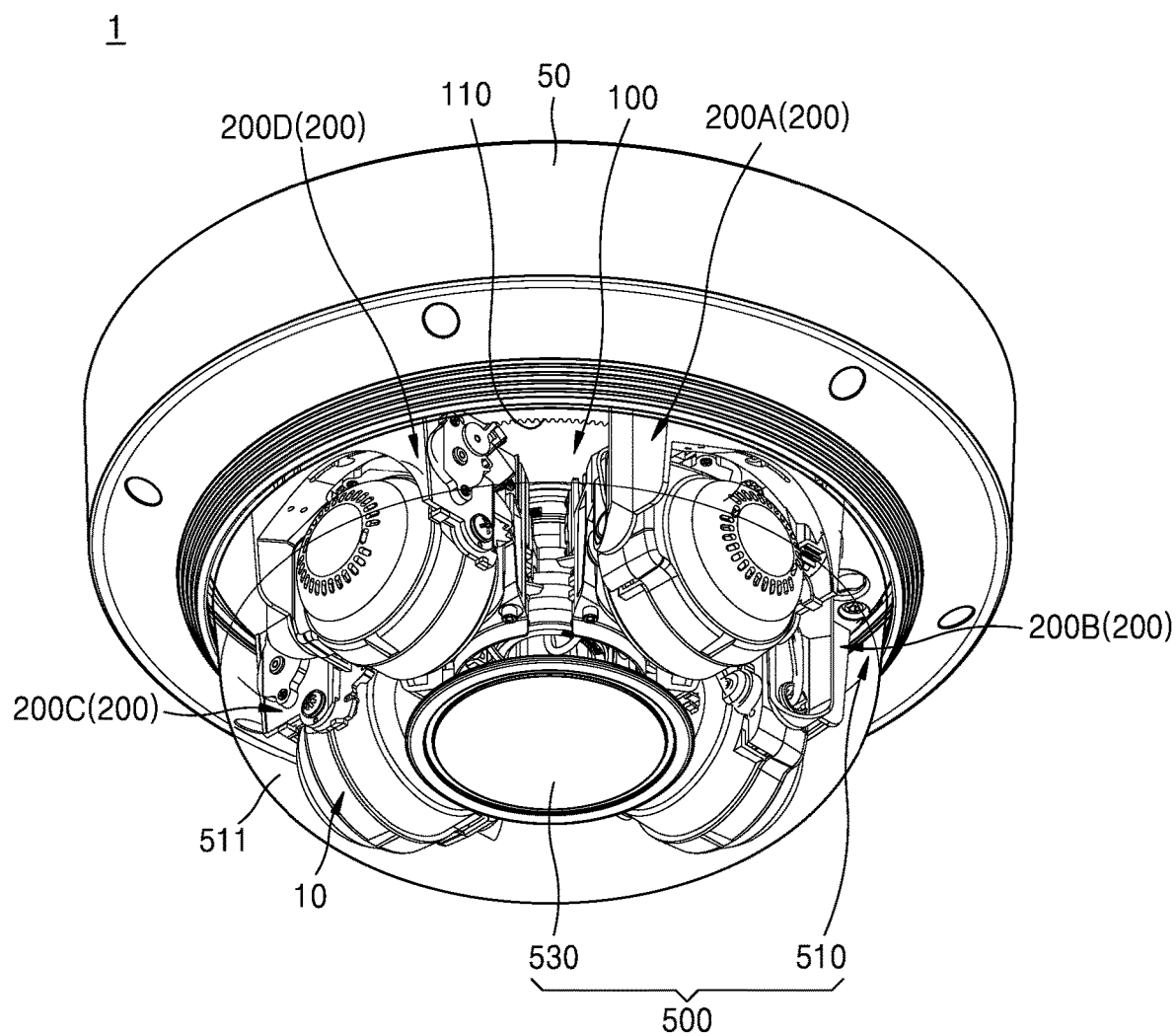
FIG. 1 is a perspective view of a multi-camera apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the embodiments described hereinafter, the terms first, second, etc. are only used to distinguish one element from another and not for purposes of limitation.

In the embodiments described hereinafter, the singular forms "a," "an" and "the" are intended to include the plural forms as well, unless the context clearly indicates otherwise.

In the embodiments described hereinafter, the terms "comprises," "comprising," "includes" and/or "including," specify the presence of stated features or elements but do not preclude the presence or addition of one or more other features or elements.

In the drawings, the sizes of elements may be exaggerated or reduced for convenience of explanation. For example, the size and the thickness of each element in the drawings are randomly shown for convenience of explanation. Thus, the disclosure is not necessarily limited to the illustrations.

Hereinafter, a multi-camera apparatus according to embodiments are described.

Figure 2:
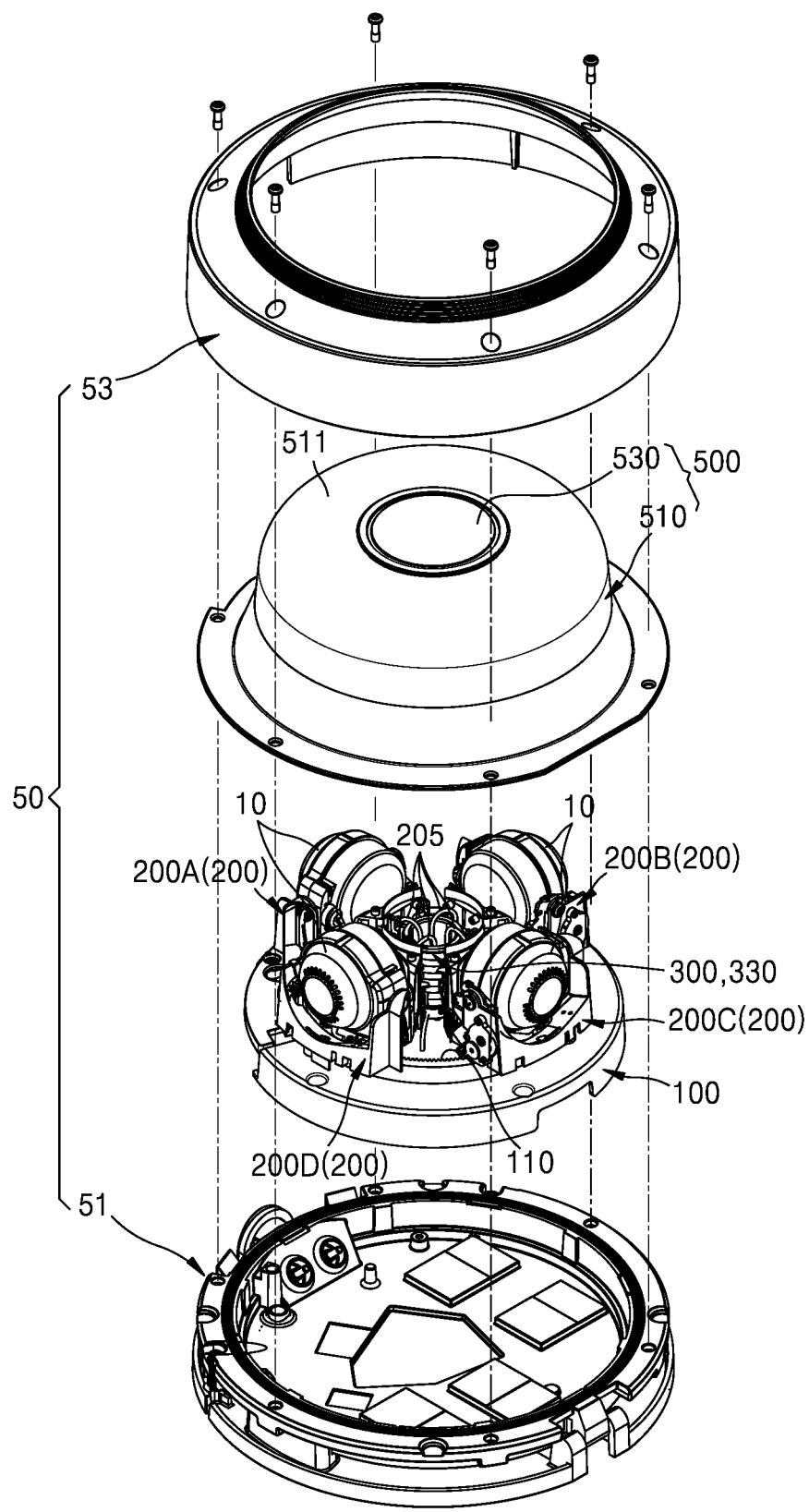
FIG. 2 is an exploded view of a multi-camera apparatus according to an embodiment.
Figure 3:
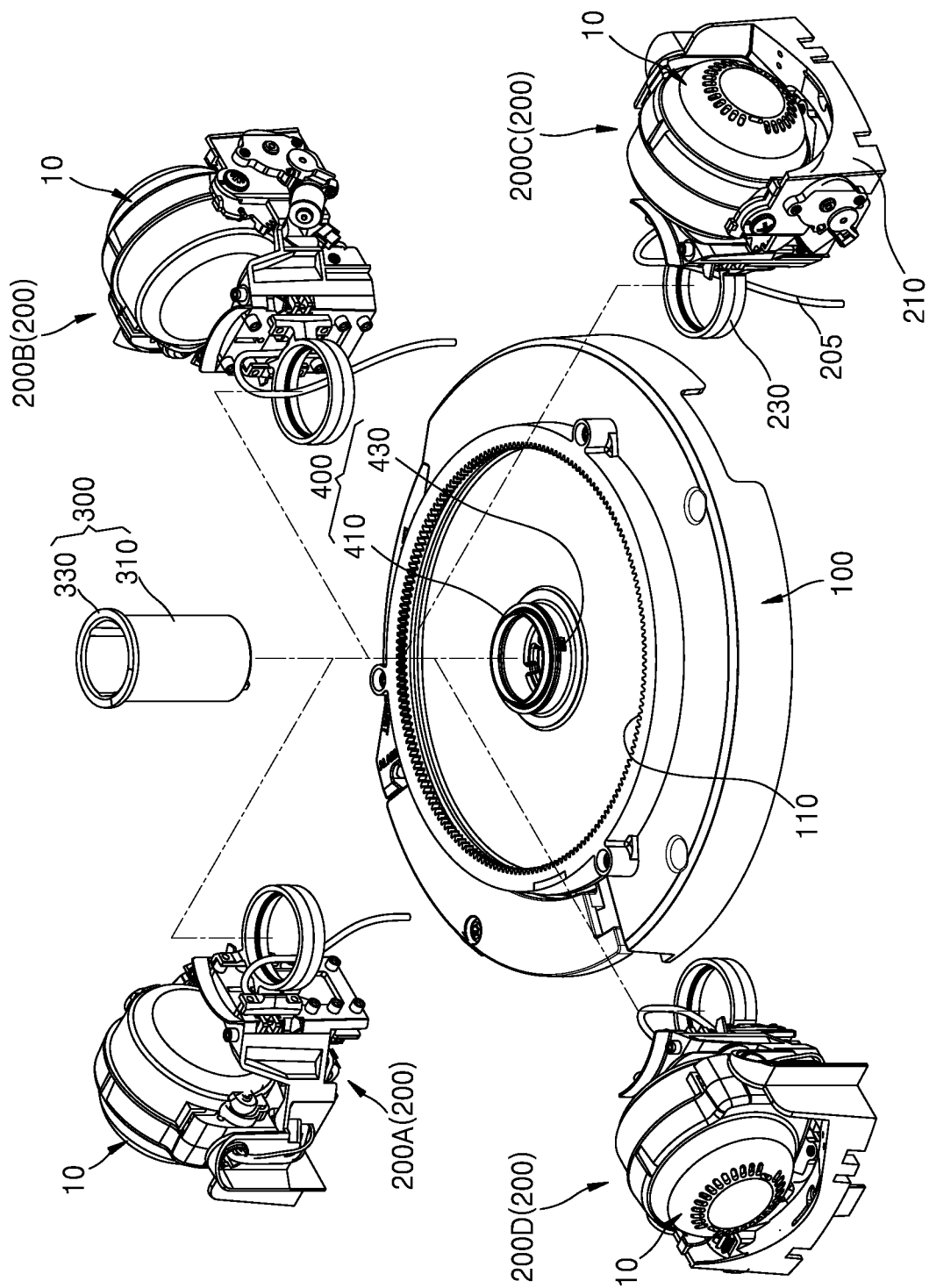
FIG. 3 is an exploded view of a driving base, a shaft, and a camera mount according to an embodiment.
Figure 4:
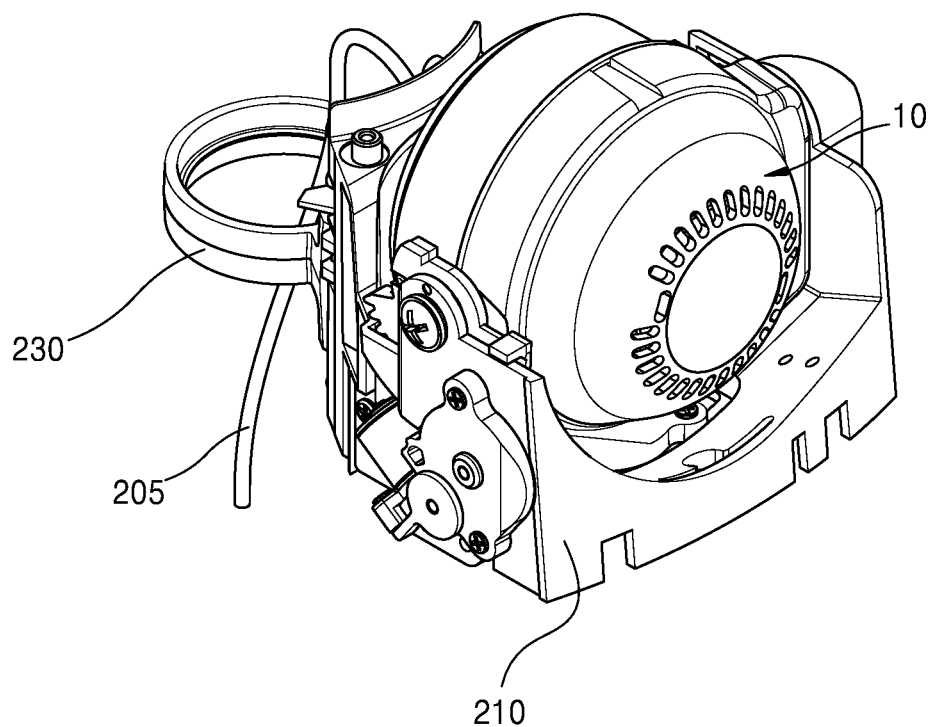
FIG. 4 is a perspective view of a camera mount according to an embodiment.
Figure 5:
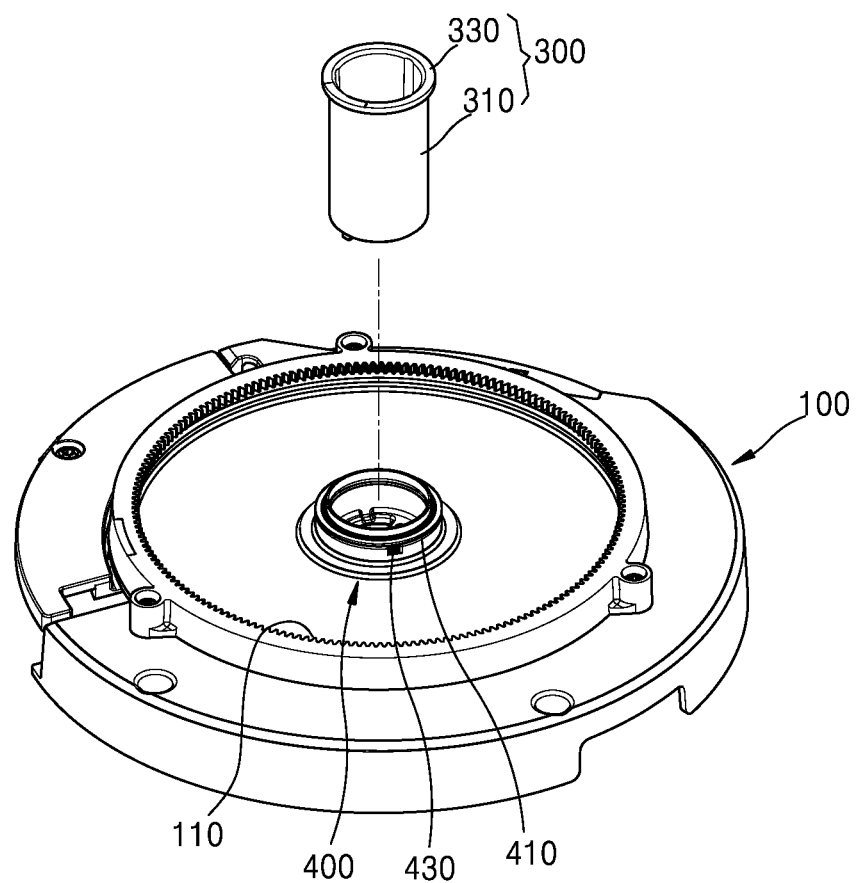
FIG. 5 is an exploded view of a driving base and a shaft according to an embodiment.
Figure 6:
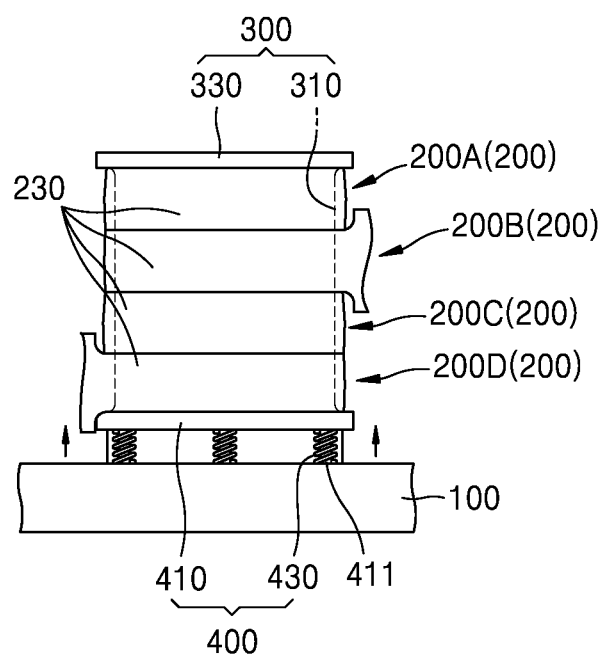
FIG. 6 is a schematic view showing a camera mount connected to a shaft, according to an embodiment.
Figure 7:
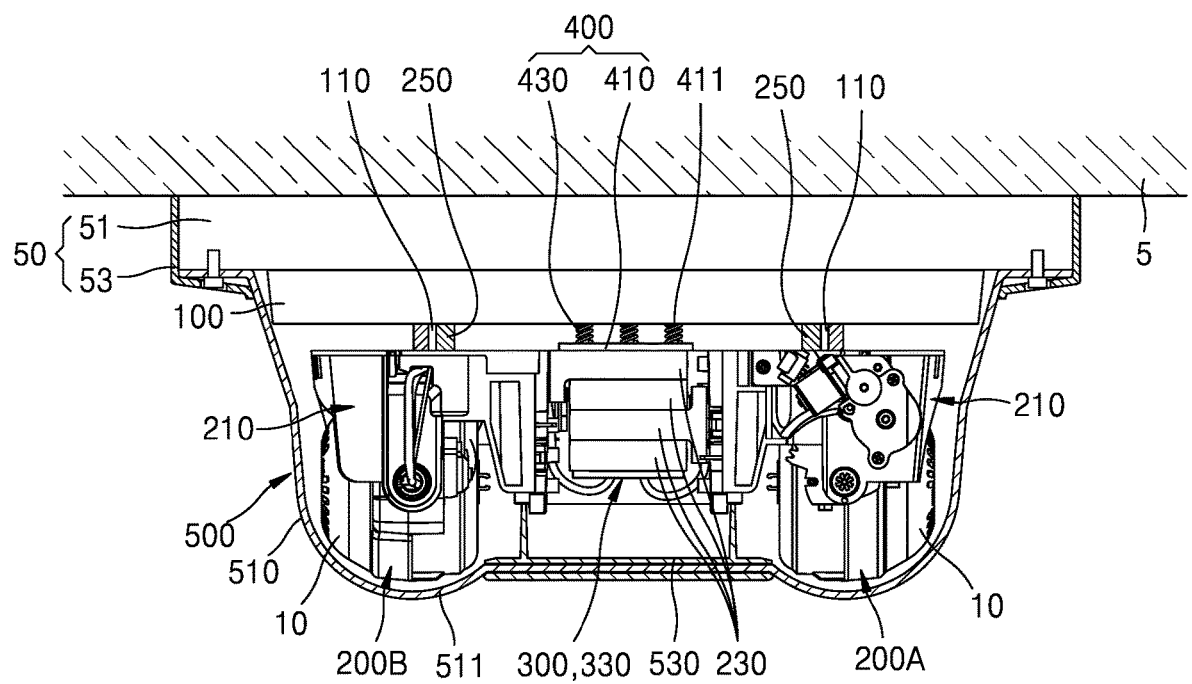
FIG. 7 is a cross-sectional view of a multi-camera apparatus according to an embodiment.

FIG. 1 is a perspective view of a multi-camera apparatus according to an embodiment. FIG. 2 is an exploded view of the multi-camera apparatus according to an embodiment. FIG. 3 is an exploded view of a driving base, a shaft, and a camera mount according to an embodiment. FIG. 4 is a perspective view of the camera mount according to an embodiment. FIG. 5 is an exploded view of the driving base and the shaft according to an embodiment. FIG. 6 is a schematic view of a state in which the camera mount is connected to the shaft, according to an embodiment. FIG. 7 is a cross-sectional view of the multi-camera apparatus according to an embodiment.

Referring to FIGS. 1 through 7, a multi-camera apparatus 1 according to an embodiment may include a driving base 100, a camera mount 200, a shaft 300, a regulator 400, and a cover 500.

Referring to FIGS. 1 through 3 and 5 through 7, the driving base 100 according to an embodiment may be coupled to an external device, for example, a plate 50, and more particularly, a plate body 51 of the plate 50, to be described below.

Referring to FIGS. 1, 3, and 5, a movement path may be formed in the driving base 100 and one or more camera mounts 200A, 200B, 200C, and 200D which may contact the driving base 100 may move along the movement path.

The camera mount 200 may rotate along the movement path formed in the driving base 100 in a clock-wise direction or an anti-clockwise direction with the center of the driving base 100 as a rotational axis.

Referring to FIGS. 1, 3, and 7, a gear 110 may be formed along an inner circumferential surface of the driving base 100 according to an embodiment, and the gear 110 and the camera mount 200, more specifically, a power transmitter 250 of the camera mount 200 (see FIG. 7), may engage with each other so that the camera mount 200 rotates in the clock-wise direction or the anti-clock wise direction with the center of the driving base 100 as the rotational axis.

According to the disclosure, the gear 110 may be formed at the inner circumferential surface of the driving base 100 toward the center of the driving base 100. However, it is not limited thereto and the gear 110 may be formed at an outer circumferential surface of the driving base 100 to be apart from the center of the driving base 100, or may be formed at both the outer and inner circumferential surfaces.

In the multi-camera apparatus 1 according to an embodiment, the driving base 100 and the camera mount 200 interlock with each other based on the gear method so that the camera mount 200 rotates with the center of the driving base 100 as the rotational axis. However, it is not limited thereto, and may be variously modified. For example, a roller may be formed in the camera mount 200 along the movement path formed in the driving base 100.

Referring to FIGS. 3, 4, and 5, the shaft 300 to be described below may be coupled to the driving base 100 according to an embodiment. The shaft 300 may be coupled to the driving base 100 by sharing a central axis with the driving base 100.

Referring to FIGS. 5 and 6, the regulator 400 to be described below may be coupled to the driving base 100. The regulator 400 may include a regulating plate 410 and an elastic member 430, wherein the regulating plate 410 may be arranged to be apart from a surface of the driving base 100 and the elastic member 430 may be formed between the regulating plate 410 and the driving base 100.

Accordingly, the elastic member 430 may push the regulating plate 410 in a direction away from the driving base 100 (in an upward direction in FIG. 6) so that heights of the plurality of camera mounts 200A, 200B, 200C, and 200D connected to the shaft 300 in a stacked manner may become constant.

Referring to FIGS. 1 through 4, 6, and 7, camera modules 10 may be mounted in the camera mount 200 according to an embodiment, and the camera mount 200 may contact the driving base 100 and move on the movement path.

The camera mount 200 according to an embodiment may include the plurality of camera mounts 200A, 200B, 200C, and 200D, and the plurality of camera modules 10 may be provided to correspond to the plurality of camera mounts 200A, 200B, 200C, and 200D and may be mounted in the plurality of camera mounts 200A, 200B, 200C, and 200D, respectively.

Referring to FIGS. 1 through 4 and 7, the camera modules 10 according to an embodiment may obtain an image about a region in which the multi-camera apparatus 1 according to an embodiment is mounted. The camera modules 10 may operate in response to a signal applied from the outside and may rotate, change a captured region and capture an image of the captured region.

The camera modules 10 according to an embodiment may include a lens portion, an imaging device, and an image processor. The camera modules 10 may each be a camera. The lens portion (not shown) may receive a light source, the imaging device (not shown) may convert the light source into an electrical signal, and the image processor (not shown) may process the signal generated by the imaging device to generate image data. The image processor may include at least one processor and memory comprising computer instructions. The computer instructions, when executed by the at least one processor, may be configured to cause the image processor to perform its functions.

The lens portion according to an embodiment may rotate on its axis in the camera modules 10, and thus, may flexibly regulate a region which may be captured.

Although not shown, the camera modules 10 may further include a controller supplying power, communicating with the outside, and controlling an operation of the camera modules 10. The controller may include at least one processor and memory comprising computer instructions. The computer instructions, when executed by the at least one processor, may be configured to cause the controller to perform its functions.

Other configurations of the camera module 10 mounted in a camera mounting body 210 may be provided. For example, any conventional configuration of mounting camera modules may be used, the descriptions of which are omitted.

Referring to FIGS. 1 through 4, 6, and 7, each of the plurality of camera mounts 200A, 200B, 200C, and 200D of the camera mount 200 according to an embodiment may include a cable 205, the camera mounting body 210, a connector 230, and a power transmitter 250.

The cable 205 may supply power to the camera mounting body 210 or the camera module 10 from a power portion (not shown) which may be mounted in a plate 50 or the driving base 100, and may be mounted in each of the plurality of camera mounts 200A, 200B, 200C, and 200D.

The plurality of cables 205 may be electrically connected to the controller, and thus, may separately transmit electrical signals to the plurality of camera mounting bodies 210 and the camera modules 10.

The cables 205 may be arranged inside the shaft 300 to be described below, in detail, in a shaft body 310. Also, the cables 205 may be arranged to be apart from each other in the shaft body 310 coupled to the driving base 100 by having a common central axis with the driving base 100, and thus, the cables 205 of the camera mounts 200A, 200B, 200C, and 200D may be prevented from being tangled or twisted.

Each cable 205 may be connected to a separate connector so as to be electrically connected to a circuit substrate (not shown) mounted in the driving base 100.

Referring to FIGS. 1 through 4 and 7, for each camera module 10 of the plurality of camera mounts 200A, 200B, 200C, and 200D, the camera module 10 may be mounted in the camera mounting body 210 according to an embodiment and the camera module 10 may tilt on the camera mounting body 210.

Accordingly, the camera module 10 may rotate in a vertical direction (in FIG. 4) on the camera mounting body 210 and capture an outside circumstance. While FIG. 4 illustrates only a camera mount 200A, the camera mounts 200B, 200C, and 200D may have a same or similar configuration to camera mount 200A.

Referring to FIGS. 2 through 4, the camera mounting body 210 according to an embodiment may be arranged on the driving base 100. In detail, the camera mounting body 210 may be arranged on the movement path formed in the driving base 100.

Accordingly, the power transmitter 250 (see FIG. 7) connected to the camera mounting body 210 may engage with the movement path formed on the driving base 100, more specifically, the gear 110 of the driving base 100, and the camera mounting body 210 may move on the driving base 100.

Due to the power transmitter 250 of each of the plurality of camera mounting bodies 210, each camera mounting body 210 may perform a panning operation of rotating 360 degrees around the center of the driving base 100 and the shaft 300 as a rotational axis.

Each power transmitter 250 may be connected to a controller (not shown) and the controller may control an operation of each power transmitter 250 such that camera mounting bodies 210 do not collide with each other. The controller may include at least one processor and memory comprising computer instructions. The computer instructions, when executed by the at least one processor, may be configured to cause the controller to perform its functions.

Referring to FIGS. 3, 4, and 6, the connectors 230 may be connected to the camera mounting bodies 210 according to an embodiment. The connectors 230 connected to the plurality of camera mounting bodies 210 may be located in different locations of the camera mounting bodies 210.

In detail, referring to FIGS. 3 and 6, the connectors 230 connected to the plurality of camera mounting bodies 210, respectively, may have different heights, when the plurality of camera mounting bodies 210 are on the same plane.

Accordingly, while the camera mounting bodies 210 have the same height, the plurality of connectors 230 may be arranged at the shaft 300, more specifically, the shaft body 310 of the shaft 300, mounted in the center of the driving base 100, as a stack.

Referring to FIGS. 3 and 4, each of the camera mounting bodies 210 according to an embodiment may be clamped with a respective connector 230 via a clamping member, such as a bolt, etc., and a location of each connector 230 may be regulated on a respective one of the camera mounting bodies 210.

Referring to FIGS. 3, 4, 6, and 7, each of the connectors 230 according to an embodiment may be coupled to a respective one of the camera mounting bodies 210 and may be connected to the shaft 300.

Referring to FIGS. 3 and 6, the connectors 230 according to an embodiment may be coupled to the camera mounting bodies 210 at different locations of the camera mounting bodies 210, and the connectors 230 coupled to the plurality of camera mounting bodies 210, respectively, may be connected to the shaft 300 by sharing a rotational axis with the shaft 300.

The connectors 230 may be formed as a ring shape and may be connected to the shaft 300, more specifically, the shaft body 310 of the shaft 300, by surrounding the shaft 300, in detail, the shaft body 310. Referring to FIG. 6, the plurality of connectors 230 according to an embodiment may be stacked in a longitudinal direction of the shaft 300, more specifically, the shaft body 310 of the shaft 300.

Accordingly, distances between the center of the driving base 100 and the plurality of camera mounting bodies 210 in which the plurality of camera modules 10 are mounted, respectively, may be the same, and the plurality of camera mounting bodies 210 may rotate 360 degrees along the movement path formed in the driving base 100 by having the center of the driving base 100, that is, the center of the shaft 300, as the same rotational axis.

Referring to FIGS. 2, 3, 6, and 7, the connectors 230 according to an embodiment may be connected to the camera mounting bodies 210 to have fixed locations, and the connectors 230 coupled to the plurality of camera mounting bodies 210, respectively, are connected to the camera mounting bodies 210 as a stacked structure. Thus, heights of the camera mounting bodies 210 moving on the driving base 100 may become constant.

Furthermore, the camera mounting bodies 210 may rotate at predetermined heights based on the center of the driving base 100, and thus, the camera modules 10 mounted in the camera mounting bodies 210 may stably capture an image and shaking of the camera mount 200 due to height errors may be prevented.

Referring to FIG. 7, the power transmitters 250 according to an embodiment may be mounted in respective ones of the camera mounting bodies 210, and may receive power from the outside and transmit the power to the camera mounting bodies 210, respectively, so that the camera mounting bodies 210 may move on the driving base 100.

The power transmitters 250 may each include a motor generating rotational power so that the camera mounting bodies 210 may move on the driving base 100 by using the rotational power generated by a respective one of the motors.

Each of the power transmitters 250 according to an embodiment may include a gear member to interlock with the gear 110 formed in the driving base 100.

Accordingly, the gear member of each of the power transmitters 250 may interlock with the gear 110 on the driving base 100 to allow a respective one of the camera mounts 200A, 200B, 200C, and 200D, more specifically, a respective one of the camera mounting bodies, to perform a panning operation in which such camera mount, more specifically, the camera mounting body 210 of such camera mount to rotate 360 degrees around the center of the driving base 100 as a rotational axis.

When a camera mount according to the related art performs a panning operation on a driving base, a power transmitter is arranged in the center of the driving base and a movement path is formed on the driving base as a shape of a rail. Also, wheels are arranged at both sides of the rail and a camera mounting body moves on the rail by rotational power of the power transmitter.

In such related art, a rotational center for the panning operation corresponds to the center of the driving base and a motor or the like is mounted in the center of the driving base. Also, the camera mounting body may move on the movement rail by using torque of the motor, which is the rotational power. However, due to a distance between the center of the driving base and the movement path at which the camera mounting body is located, large torque is required.

Also, since the wheels move at both sides of the movement path while contacting each other, a friction area may be increased and the rotational power of the motor may be lost.

In addition, since the motor or the like transmitting driving power to the camera mounting body is located in the center of the driving base, a radius of rotation of the camera mounting body moving on the movement path is relatively increased, and power is relatively decreased at the same torque, inversely proportionally with respect to the radius of rotation. Thus, there is a limit to increase the speed.

Thus, the movement speed of the camera mounting body moving on the driving base is deteriorated and a rapid panning operation is not possible.

However, the power transmitters 250 according to an embodiment may be mounted in respective ones of the camera mounting bodies 210, and may be located to directly engage with the movement path on the driving base 100, more specifically, the gear 110 of the driving base 100.

Accordingly, the radius of rotation of the power transmitters 250 may be decreased compared to the radius of rotation in the case of the panning method of the camera mounting body according to the related art, and thus, power may be increased at the same torque and the camera mount 200 may rapidly move on the movement path formed on the driving base 100 at relatively high speed.

Referring to FIGS. 3 and 5 through 7, the shaft 300 according to an embodiment may be at the center of the driving base 100 and may be coupled to the driving base 100. The shaft 300 may include the shaft body 310 and a shaft cover 330.

Referring to FIGS. 3 and 5 through 7, the shaft body 310 according to an embodiment may be connected to the camera mounts 200A, 200B, 200C, and 200D. In detail, the shaft body 310 may be arranged inside the connectors 230 coupled to the plurality of camera mounting bodies 210.

Referring to FIGS. 3 and 6, the shaft body 310 according to an embodiment may be formed to have a cylindrical shape and the connectors 230 may be connected to the shaft body 310 by surrounding the shaft body 310.

The connectors 230 coupled to the plurality of camera mounting bodies 210, respectively, may be connected to the shaft body 310 as a stacked structure by surrounding the shaft body 310.

Accordingly, the plurality of camera mounts 200A, 200B, 200C, and 200D may have the same radius of rotation and may perform a panning operation of moving on the movement path of the driving base 100.

In addition, the connectors 230 of the plurality of camera mounts 200A, 200B, 200C, and 200D may be stacked by having different heights from each other, and thus, the camera mount 200 moving on the movement path may keep a constant height.

In addition, the shaft body 310 may be arranged in the center of the driving base 100, prevent light entering into or emitted from any one camera mount (e.g. camera mount 200A) of the camera mount 200 arranged outside the center of the driving base 100 from entering into or being reflected from another camera mount (e.g. camera mount 200B) of the camera mount 200, and allow the camera mount 200 to obtain a vivid image(s).

Referring to FIGS. 3 and 5 through 7, the shaft cover 330 according to an embodiment may have a relatively larger area than a cross-sectional area of the shaft body 310 and may be coupled to an end (an upper end in FIG. 3) of the shaft body 310.

Since the shaft cover 330 has the relatively larger area than the cross-sectional area of the shaft body 310, the camera mounts 200, more specifically, the connectors 230 connected to the shaft body 310 may be prevented from being detached toward the uppers side (FIG. 3).

Referring to FIGS. 2 and 5 through 7, the regulator 400 according to an embodiment may face the shaft cover 330 and may be arranged outside the shaft body 310. The regulator 400 may regulate locations of the plurality of connectors 230 connected to the shaft body 310.

The regulator 400 according to an embodiment may push the plurality of connectors 230 on the shaft body 310 toward the shaft cover 330.

Accordingly, a gap may be prevented from being generated between the shaft body 310 and the shaft cover 330, and the connectors 230 in a longitudinal direction (a longitudinal direction in FIG. 6), and the connectors 230 and the camera mounting bodies 210 to which the connectors 230 are coupled may be arranged at the same height.

Referring to FIGS. 2 and 5 through 7, the regulator 400 according to an embodiment may include the regulating plate 410 and the elastic member 430.

Referring to FIGS. 4 and 5, the regulating plate 410 may be arranged below (in FIG. 6) the connectors 230 such that the plurality of connectors 230 are arranged between the shaft cover 330 and the regulating plate 410. The regulating plate 410 may be arranged at the outside of the shaft body 310 and may be formed to be flat.

Since the regulating plate 410 is formed to be flat, a surface of the regulating plate 410 may contact a surface (a bottom surface in FIG. 6) of the lowermost connector 230 from among the plurality of connectors 230, and thus, a pressing force may be evenly distributed.

Referring to FIG. 6, the regulating plate 410 according to an embodiment may be arranged to be apart from the driving base 100 and the elastic member 430 may be arranged between the driving base 100 and the regulating plate 410.

The elastic member 430 according to an embodiment may include an elastic material and may push the regulating plate 410 toward the shaft cover 330. Accordingly, the plurality of connectors 230 contacting the shaft cover 330 may maintain a constant height.

The elastic member 430 may be provided in a multiple number and may be arranged at equal angles based on the center of the driving base 100.

According to the disclosure, the elastic member 430 may include three elastic members and may be arranged at equal angles based on the center of the driving base 100 and the shaft body 310. Also, the elastic member 430 may contact the regulating plate 410 and press the regulating plate 410 toward the shaft cover 330.

However, it is not limited thereto, a single elastic member may surround the shaft body 310 and may have a surface contact with the regulating plate 410 so as to press the regulating plate 410 and the plurality of connectors 230 arranged between the regulating plate 410 and the shaft cover 330 toward the shaft cover 330. Like this, various modified embodiments may be possible.

The elastic member 430 according to an embodiment may include one or more coil springs. When the elastic member 430 includes a plurality of elastic members, the elastic members may be arranged at equal angles at the outside of the center of the driving base 100 and the shaft body 310. In a case where the elastic member 430 includes a plurality of elastic members, the inserter 411 may include a respective inserter for each of the plurality of elastic members.

Also, when only one elastic member 430 is formed, the elastic member 430 may surround the outside of the shaft body 310 and press the regulating plate 410 and the plurality of connectors 230 arranged between the regulating plate 410 and the shaft cover 330 toward the shaft cover 330 (in an upward direction in FIG. 6)

Referring to FIG. 6, an inserter 411 may be formed at the regulating plate 410 according to an embodiment to project in a direction toward the elastic member 430 (a downward direction in FIG. 6) and the inserter 411 may be inserted into the elastic member 430.

Referring to FIG. 6, the inserter 411 according to an embodiment may be inserted into the elastic member 430. However, it is not limited thereto, and various modifications are possible. For example, the elastic member 430 may be arranged in the inserter 411 formed as a cavity.

Since the inserter 411 according to an embodiment is formed to project outwards from the regulating plate 410, the elastic member 430 may be arranged at the outside or the inside of the inserter 411 and the elastic member 430 may be prevented from being detached from a path for pressing the regulating plate 410.

In addition, since at least one elastic member 430 presses the regulating plate 410 upwards (in FIG. 6), the plurality of connectors 230 may adhere to the shaft cover 330 and may continually be arranged at a constant height.

Since the plurality of connectors 230 are arranged at a constant height, the plurality of camera mounts 200A, 200B, 200C, and 200D may move along the movement path of the driving base 100 at the same height.

Furthermore, when the plurality of camera mounts 200A, 200B, 200C, and 200D, more specifically, the power transmitters 250 interlock with the gear 110 formed on the movement path of the driving base 100, the plurality of camera mounts 200A, 200B, 200C, and 200D, more specifically, the power transmitters 250, may stably interlock with the gear 110 along a defined path.

Also, the connectors 230 may be arranged at a pre-set location between the shaft 300 and the regulator 400, more specifically, between the shaft cover 330 and the regulating plate 410, and thus, shaking on the movement path may be prevented and precise location control may be possible.

According to an embodiment, the elastic member 430 upwardly pushes the regulating plate 410. However, it is not limited thereto, and the elastic restoring force may operate downwardly (in FIG. 3) to pull the regulating plate 410. Like this, various modified embodiments may be possible.

Referring to FIGS. 1, 2, and 7, the cover 500 according to an embodiment may cover the driving base 100 and the camera mount 200 and may be coupled to the shaft 300. The cover 500 may include a transparent material.

The cover 500 according to an embodiment may include a cover body 510 and a connecting cover 530. The cover 500 may be coupled to the plate body 51 or the driving base 100.

Referring to FIG. 2, the cover 500 according to an embodiment may be coupled to the plate body 51 or the driving base 100 via a screw clamping method using a bolt, etc., but it is not limited thereto. Various modifications may be possible within a technical range in which a location of the cover 500 may be fixed in the plate body 51 or the driving base 100.

Referring to FIGS. 1, 2, and 7, the cover body 510 according to an embodiment may include a transparent material so that the camera mount 200 mounted therein may capture an external situation. Also, the cover body 510 may be formed in a dome shape.

A bent portion 511 having a predetermined radius of curvature may be formed at the center of the cover body 510 according to an embodiment. The bent portion 511 may be formed along an outer circumferential surface of the cover body 510 to be bent toward the center of the cover body 510.

Since the bent portion 511 is formed at the cover body 510, the multi-camera apparatus 1 according to the disclosure may reduce irregular reflection due to light introduced into the multi-camera apparatus 1, compared to a case in which the cover body 510 is formed in a semi-spherical shape without a bent portion.

The bent portion 511 formed at the cover body 510 according to an embodiment may be connected to the connecting cover 530 to be described below. The connecting cover 530 may directly or indirectly cover the shaft 300, more specifically, the shaft cover 330 of the shaft 300.

Accordingly, the shaft 300, more specifically, the shaft body 310 may be arranged on a path of reflection of light reflected from an inner surface of the cover body 510, and the light may be prevented from being reflected from an inner circumferential surface of the cover body 510 facing any one camera mount (e.g. camera mount 200A) of the camera mount 200 toward an inner surface of the cover body 510 facing another camera mount (e.g. camera mount 200B) of the camera mount 200. Thus, diffused reflection may be prevented.

Since the diffused reflection is prevented, the multi-camera apparatus 1 according to an embodiment may obtain a vivid image with respect to a captured region.

Referring to FIGS. 1, 2, and 7, the connecting cover 530 according to an embodiment may be connected to the cover body 510, more specifically, an inner end of the bent portion 511 formed at the center of the cover body 510.

The connecting cover 530 may be connected to the shaft 300, more specifically, the shaft cover 330, and since the connecting cover 530 is arranged on a path of reflection of light introduced to a side based on the center of the cover 500, the light may be prevented from moving toward the other side.

Accordingly, the reflection of light from an inner circumferential surface of the cover body 510 facing any one camera mount (e.g. camera mount 200A) of the camera mount 200 toward an inner surface of the cover body 510 facing another camera mount (e.g. camera mount 200B) of the camera mount 200 may be prevented, and thus, spread reflection may be prevented.

An operating principle and effects of the multi-camera apparatus 1 according to an embodiment are described.

Referring to FIGS. 1 through 7, the multi-camera apparatus 1 according to an embodiment may include the driving base 100, the camera mount 200, the shaft 300, the regulator 400, and the cover 500.

Referring to FIGS. 1 and 2, the driving base 100 according to an embodiment may be coupled to the plate 50, a location of which is fixed to the outside, such as a ceiling 5 (see FIG. 7), etc. In detail, the driving base 100 may be coupled to the plate body 51.

A movement path may be formed in the driving base 100. In detail, the gear 110 may be formed along an inner circumferential surface of the driving base 100, and the gear 110 may be formed to interlock with the power transmitters 250 connected to the camera mount 200, in detail, the camera mounting bodies 210.

The camera mount 200 may include the camera mounting bodies 210, the connectors 230, and the power transmitters 250. A location of the connectors 230 may be fixed to a respective one of the camera mounting bodies 210, and the connectors 230 may be connected to the shaft 300, more specifically, the shaft body 310 of the shaft 300.

The connectors 230 may be connected to the shaft body 310 and may be formed to be rotatable along an outer circumferential surface of the shaft body 310 that is at a center of the driving base 100.

Accordingly, the camera mounting bodies 210 in which the camera modules 10 may be mounted and which are coupled to respective ones of the connectors 230, may receive power from a respective one of the power transmitters 250 interlocking with the gear 110, and may perform a panning operation in which the camera mounting bodies 210 may rotate in a clockwise direction or an anti-clockwise direction around the center of the driving base 100 and the shaft body 310 as a rotational center.

Referring to FIGS. 1, 2, and 3, the camera mount 200 according to an embodiment may include a plurality of camera mounts 200A, 200B, 200C, and 200D, which may be arranged along the movement path on the driving base 100 to be apart from each other based on the center of the driving base 100 and the shaft 300.

The connectors 230 connected to plurality of camera mounting bodies 210, respectively, may be connected to the shaft 300 by having different heights from each other, and thus, the camera mounts 200A, 200B, 200C, and 200D may have the same radius of rotation.

Referring to FIG. 6, the connectors 230 connected to the plurality of camera mounting bodies 210, respectively, may be connected to the shaft body 310 as a stacked structure in a longitudinal direction (a longitudinal direction) of the shaft body 310, and thus, the camera mounting bodies 210 may be located at the same height.

Referring to FIGS. 2 and 5 through 7, the shaft 300 according to an embodiment may include the shaft body 310 and the shaft cover 330, and an area of the shaft cover 330 may be relatively larger than a cross-sectional area of the shaft body 310, and thus, the connectors 230 connected to the shaft body 310 by contacting an outer circumferential surface of the shaft body 310 may be prevented from being detached from the shaft body 310.

Referring to FIGS. 3 and 5 through 7, the regulator 400 according to an embodiment may share the center with the driving base 100 and the shaft 300 and may be mounted on the driving base 100.

The regulator 400 may include the regulating plate 410 and the elastic member 430, and the plurality of connectors 230 may be connected to the shaft body 310 as a stack between the regulating plate 410 and the shaft 300, in detail, the shaft cover 330.

The regulator 400 may press the connectors 230 upwardly (in FIG. 6), and thus, the plurality of connectors 230 adhere to each other and irregular gaps between the shaft cover 330, the plurality of connectors 230, and the regulating plate 410 may not be generated.

In addition, since gaps are not formed between the shaft cover 330, the connectors 230, and the regulating plate 410, the camera mount 200 on the movement path of the driving base 100, more specifically, the camera mount 200 interlocking with the gear 110, may stably interlock with the power transmitters 250, and the camera mounting bodies 210 may smoothly move on the movement path without tilting.

Referring to FIG. 6, the inserter 411 may be formed on the regulating plate 410 facing the elastic member 430 in a protruding way, and the inserter 411 may be inserted into the elastic member 430, and thus, adhesion of the regulating plate 410 and the elastic member 430 may be improved and the elastic member 430 may have a constant central axis.

Since the central axis of the elastic member 430 is constant, a plurality of elastic members may uniformly press the regulating plate 410.

Referring to FIG. 3, the connectors 230 included in the plurality of camera mounts 200A, 200B, 200C, and 200D, respectively, may be connected to the shaft 300, more specifically, the shaft body 310, and may be arranged on the regulator 400 mounted at the center of the driving base 100.

The shaft 300 and the driving base 100 may be coupled to each other via a screw clamping method, etc. However, it is not limited thereto and various modified embodiments are possible within a technical range in which a location of the shaft 300 may be fixed on the driving base 100.

Referring to FIG. 2, the plurality of camera mounts 200A, 200B, 200C, and 200D, the shaft 300, and the regulator 400 may be coupled on the driving base 100 and the driving base 100 may be mounted on the plate 50, more specifically, the plate body 51 of the plate.

Referring to FIGS. 1, 2, and 7, the cover 500 according to an embodiment may cover the driving base 100, the camera mount 200, the shaft 300, and the regulator 400, and may be coupled to the driving base 100 or the plate 50, in detail, the plate body 51.

The cover 500 may include the cover body 510 and the connecting cover 530. The cover body 510 may include a transparent material and may be formed in a dome shape. The bent portion 511 having a predetermined radius of curvature to have a concave central portion may be formed in the cover body 510.

With the bent portion 511, spread reflection of light, which may occur at an inner surface of the cover 500, may be reduced, compared to a case in which the cover 500 has just a semi-spherical shape.

Also, the cover 500 according to an embodiment, more specifically, an inner end of the bent portion 511 may be connected to the connecting cover 530, and the connecting cover 530 may be connected to the shaft 300, in detail, the shaft cover 330.

Accordingly, light entering into a side of the cover body 510 based on the center of the cover 500 may be prevented from being reflected and moving to the other side facing the side through an inner surface of the cover body 510, and diffused reflection through the inner surface of the cover body 510 may be reduced. Thus, the camera modules 10 mounted in the camera mounting bodies 210 may obtain a vivid image.

Hereinafter, a configuration, an operating principle, and effects of an image capturing system according to an embodiment are described.

Referring to FIGS. 1 through 7, the image capturing system according to an embodiment may include the plate 50 and the multi-camera apparatus 1. Referring to FIGS. 1, 2, and 7, the multi-camera apparatus 1, more specifically, the driving base 100 may be mounted on the plate 50 according to an embodiment, and a location of the plate 50 may be fixed to the outside, such as the ceiling 5 (see FIG. 7), etc.

The plate 50 according to an embodiment may include the plate body 51 and the plate cover 53. The plate body 51 may contact the ceiling 5, etc. and may be clamped by using a clamping member, such as a bolt, etc., to have a fixed location.

The multi-camera apparatus 1, more specifically, the driving base 100 may be mounted on the plate body 51 according to an embodiment. Also, a circuit portion (not shown), such as a printed circuit board (PCB) substrate, may be mounted on the plate body 51.

The circuit portion, such as the PCB substrate, may be mounted not only on the plate body 51, but also on the driving base 100. Like this, various modified embodiments are possible.

In addition, the camera mount 200, more specifically, the cables 205, etc. may be connected to the plate body 51 to receive power from the outside.

Referring to FIGS. 1, 2, and 7, the plate cover 53 according to an embodiment may be coupled to the plate body 51 and may be coupled to the plate body 51 by surrounding the multi-camera apparatus 1, more specifically, the cover 500.

The clamping member, such as a bolt, etc., may penetrate the plate cover 53 to be clamped to the plate body 51, an outer end of the cover 500 may be arranged between the plate body 51 and the plate cover 53, and due to the clamping member, the plate body 51, the cover 500, and the plate cover 53 may be sequentially stacked.

Also, the cover 500 coupled to the driving base 100 may be prevented from being detached from the driving base 100.

Referring to FIGS. 1 through 7, the multi-camera apparatus 1 according to an embodiment may include the driving base 100, the plurality of camera mounts 200A, 200B, 200C, and 200D, the shaft 300, the regulator 400, and the cover 500.

The configuration of the multi-camera apparatus 1 is the same as the configuration described above. Thus, the same aspects are not described in detail.

The image capturing system according to embodiments may push the shaft 300, more specifically, the connectors 230 connected to the shaft body 310 toward the shaft cover 330 by using the regulator 400 so that locations of the plurality of connectors 230 are fixed.

Also, since the regulator 400 pushes the camera mount 200, more specifically, the connectors 230 in a direction of a side (an upper side in FIG. 3), gaps generated between the connectors 230 may be minimized, and spaces between the connectors 230, spaces between the connectors 230 and the regulating plate 410, and spaces between the connectors 230 and the shaft cover 330 may become close and connected to the connectors 230 on the driving base 100. Also, shaking of the camera mounting body 210 moving on the movement path may be prevented.

Also, a rotational radius of the power transmitters 250 interlocking with the gear 110 formed on the driving base 100 and transmitting power to respective once of the camera mounting bodies 210 may be relatively reduced compared to a case in which the rotational radius of a power transmitter 250 is located at the center of the driving base 100, and thus, torque required from the power transmitters 250 may be decreased, and the camera mounting bodies 210 may move on the movement path formed on the driving base 100 relatively rapidly at the same torque.

Also, the regulator 400 may push the plurality of connectors 230 connected to the shaft body 310 toward the shaft cover 330 (upwardly in FIG. 3) so that the plurality of connectors adhere to each other, and thus, the connectors 230, and the camera mounting bodies coupled to the connectors 230, respectively, may maintain a constant height.

Also, the shaft 300 connected to the connectors 230 may be arranged at the center of the driving base 100, and the plurality of camera mounting bodies 210 may be arranged at the outside of the driving base 100. Thus, a movement path of light reflected from an inner circumferential surface of the cover body 510 and moving through the center of the driving base 100 may be blocked and reflection of light of the camera module 10 mounted in the camera mounting bodies 210 may be reduced.

Also, the bent portion 511 may be formed in the cover 500, mores specifically, the cover body 510. Thus, diffused reflection in which the light is reflected from an inner surface may be reduced compared to a case in which the cover body 510 is formed to have a semi-spherical shape.

According to the one or more embodiments described above, the plurality of camera mounts may be connected to the shaft and may move on the driving base while maintaining a constant height, and thus, shaking of the camera module may be prevented.

Also, since the shaking of the camera module is prevented, a quality of an image captured by the camera module may be increased.

Also, the rotational radius of the power transmitter may be reduced to reduce required power, and compared to a case in which the rotational radius is great, relatively a large amount of power may be transmitted at the same torque, and a moving speed of the camera module may be increased for the camera module to rapidly move on the movement path on the driving base.

Also, gaps generated between the connectors may be minimized via the regulator and shaking of the camera mounting bodies moving on the movement path may be prevented.

Also, the bent portion may be formed on the cover, and thus, spread reflection in which light is reflected from an inner surface may be reduced, compared to a case in which the cover is formed to have a semi-spherical shape.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A multi-camera apparatus comprising:
a driving base in which a movement path is formed;
at least one camera mount, each of which includes a respective camera module mounted therein, and is configured to contact the driving base and move along the movement path; and
a shaft provided at a center of the driving base and coupled to the driving base,
wherein each of the at least one camera mount is connected to the shaft and configured to move along a circumference of the driving base with the shaft as a rotational center,
wherein the at least one camera mount is a plurality of camera mounts,
the plurality of camera mounts comprises a plurality of camera mounting bodies such that each camera mount comprises a respective camera mounting body, from among the plurality of camera mounting bodies, in which the respective camera module is mounted, and
the plurality of camera mounts further comprises power transmitters such that a power transmitter, from among the power transmitters, is provided with a respective camera mount from among the plurality of camera mounts,
each power transmitter from among the power transmitters is configured to receive power from outside and transmit the power to a respective one of the plurality of camera mounting bodies so as to cause the respective one of the plurality of camera mounting bodies to move on the driving base, and
each of the power transmitters comprises a motor.

2. The multi-camera apparatus of claim 1, wherein the plurality of camera mounts further comprises connectors such that each camera mount comprises a connector, from among the connectors, coupled to the respective camera mounting body of the camera mount and connected to the shaft.

3. The multi-camera apparatus of claim 2, wherein the connectors of the plurality of camera mounts are each formed in a ring shape, are each connected to the shaft, and surround the shaft.

4. The multi-camera apparatus of claim 3, wherein the connectors of the plurality of camera mounts are stacked along a longitudinal central axis of the shaft.

5. The multi-camera apparatus of claim 4, wherein the shaft comprises:
a shaft body arranged inside each of the connectors of the plurality of camera mounts; and
a shaft cover having a larger area than a cross-sectional area of the shaft body and coupled to an end of the shaft body.

6. The multi-camera apparatus of claim 5, further comprising a regulator which is arranged outside the shaft body to face the shaft cover, is configured to contact at least one from among the connectors of the plurality of camera mounts, and regulates locations of the connectors of the plurality of camera mounts.

7. The multi-camera apparatus of claim 6, wherein the regulator has an elastic restoring force from the driving base toward the shaft cover and pushes the connectors of the plurality of camera mounts toward the shaft cover.

8. The multi-camera apparatus of claim 7, wherein the regulator comprises:
a regulating plate arranged below the connectors such that the connectors are located between the shaft cover and the regulating plate; and
an elastic member including an elastic material and configured to push the regulating plate toward the shaft cover.

9. The multi-camera apparatus of claim 8, wherein the elastic member includes a coil spring.

10. The multi-camera apparatus of claim 9, wherein
an inserter formed in the regulating plate projects toward the elastic member, and
the inserter is inserted into the elastic member.

11. The multi-camera apparatus of claim 1, wherein the power transmitters interlock with the driving base and transmit the power to each of the plurality of camera mounting bodies, respectively, so that each of the plurality of camera mounting bodies move along the circumference of the driving base.

12. The multi-camera apparatus of claim 11, wherein a gear is formed along an inner circumferential surface of the driving base and the power transmitters interlock with the gear.

13. The multi-camera apparatus of claim 1, further comprising a cover covering the driving base and the at least one camera mount,
wherein the cover is coupled to the shaft.

14. The multi-camera apparatus of claim 13, wherein the cover is formed in a dome shape.

15. The multi-camera apparatus of claim 14, wherein a bent portion formed in the cover is connected to the shaft, and the bent portion has a predetermined radius of curvature.

16. An image capturing system comprising:
a plate; and
a multi-camera apparatus mounted to the plate,
wherein the plate is fixed outside the multi-camera apparatus, and the multi-camera apparatus comprises:
a driving base in which a movement path is formed;
at least one camera mount, each of which includes a respective camera module mounted therein, and is configured to contact the driving base and move along the movement path; and
a shaft provided at a center of the driving base and coupled to the driving base,
wherein each of the at least one camera mount is connected to the shaft and configured to move along a circumference of the driving base with the shaft as a rotational center,
wherein the at least one camera mount is a plurality of camera mounts,
the plurality of camera mounts comprises a plurality of camera mounting bodies such that each camera mount comprises a respective camera mounting body, from among the plurality of camera mounting bodies, in which the respective camera module is mounted, and
the plurality of camera mounts further comprises power transmitters such that a power transmitter, from among the power transmitters, is provided with a respective camera mount from among the plurality of camera mounts,
each power transmitter from among the power transmitters is configured to receive power from outside and transmit the power to a respective one of the plurality of camera mounting bodies so as to cause the respective one of the plurality of camera mounting bodies to move on the driving base, and
each of the power transmitters comprises a motor.

* * * * *